April 1, 1947. T. R. SMITH 2,418,239
DRUM CLOTHES DRIER INCLUDING MEANS FOR CIRCULATING THE DRYING GAS OVER
THE EVAPORATOR AND CONDENSER COILS OF A REFRIGERATING DEVICE
Filed June 10, 1942 2 Sheets-Sheet 1
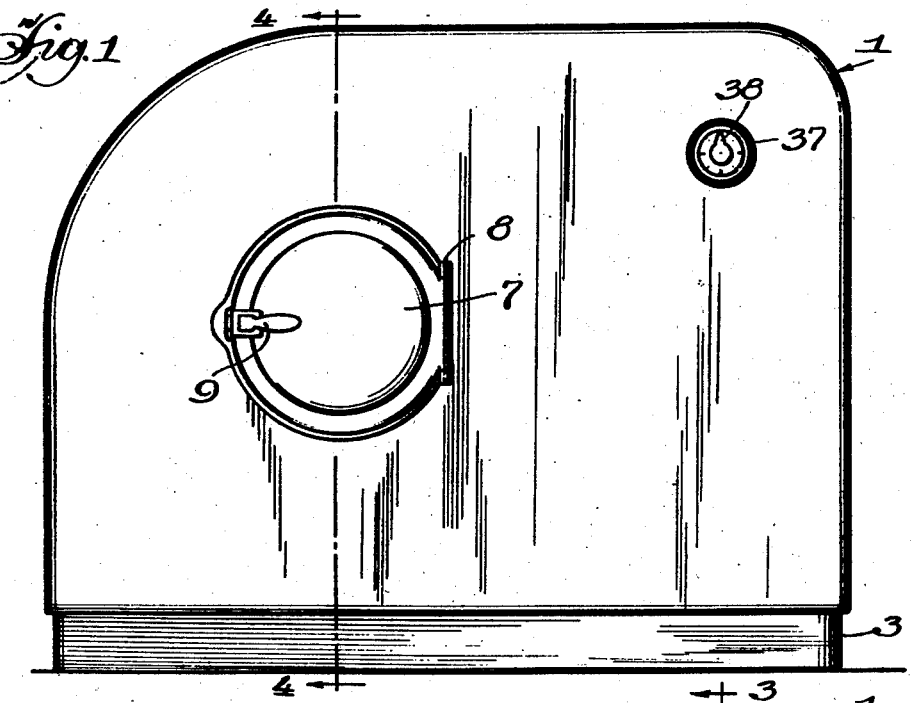
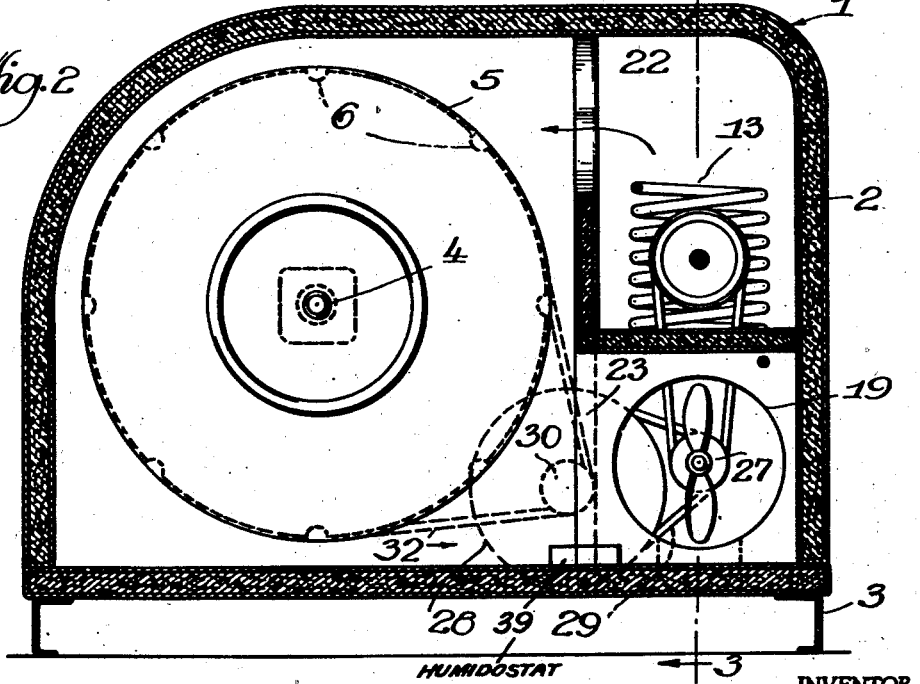

April 1, 1947.  T. R. SMITH  2,418,239
DRUM CLOTHES DRIER INCLUDING MEANS FOR CIRCULATING THE DRYING GAS OVER
THE EVAPORATOR AND CONDENSER COILS OF A REFRIGERATING DEVICE
Filed June 10, 1942  2 Sheets-Sheet 2
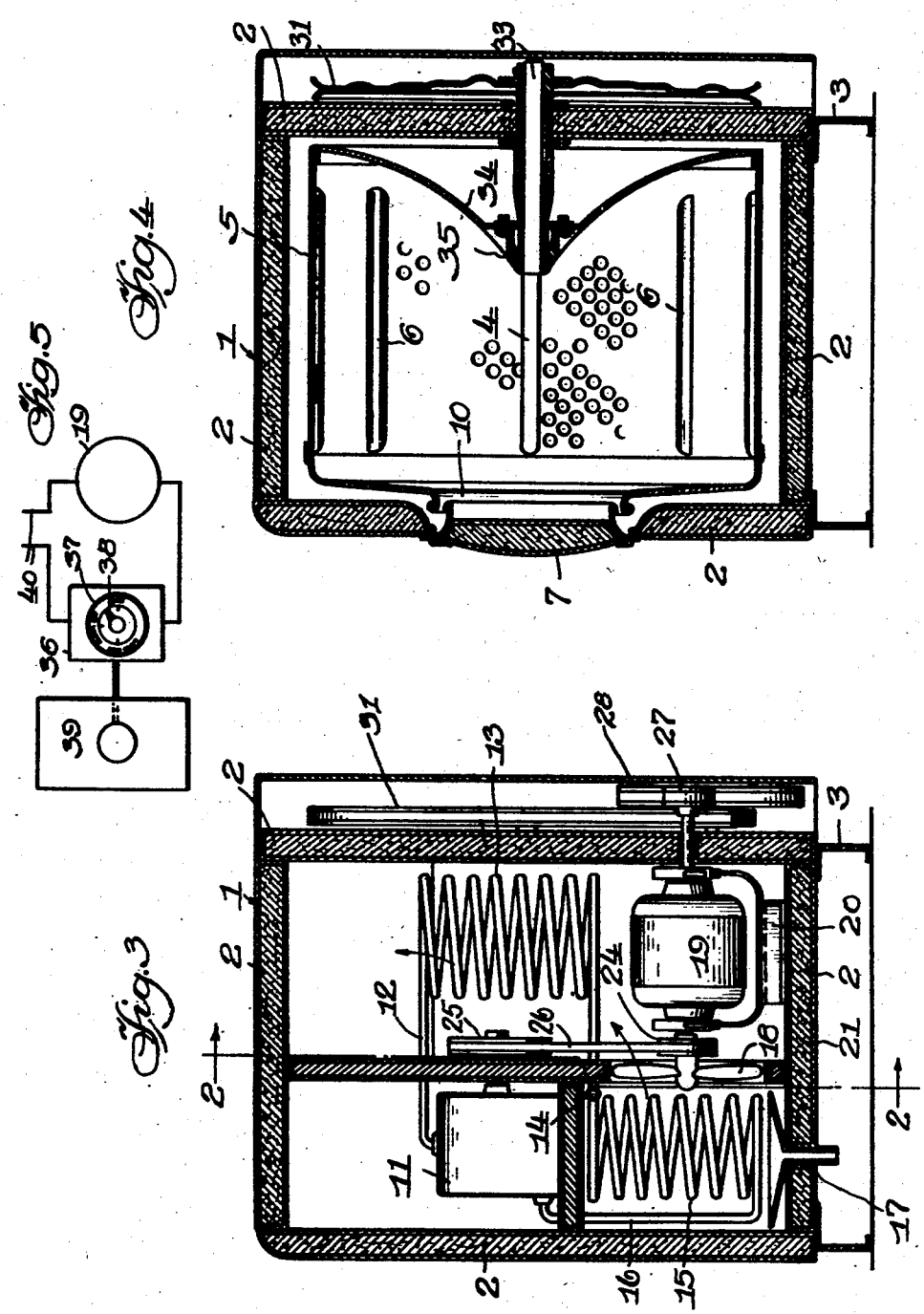
INVENTOR.
Thomas R. Smith
BY Parkinson & Lane
Attys.
Witness:

Patented Apr. 1, 1947

2,418,239

UNITED STATES PATENT OFFICE 2,418,239

DRUM CLOTHES DRIER INCLUDING MEANS FOR CIRCULATING THE DRYING GAS OVER THE EVAPORATOR AND CONDENSER COILS OF A REFRIGERATING DEVICE

Thomas R. Smith, Newton, Iowa, assignor to The Maytag Company, Newton, Iowa, a corporation of Delaware Application June 10, 1942, Serial No. 446,438

1 Claim. (Cl. 34—77)

The present invention relates to a system for drying clothes, and more especially to a novel clothes drier of the portable, compact and self-contained type primarily adapted for household use. In the novel embodiment the wet clothes are tumbled about in a perforated container or cylinder rotatably mounted in an enclosure through which is passed heated air having a low relative humidity. The novel system or unit includes means for passing the air through a continuous cycle in which the air is heated, then passed through the perforated receptacle or cylinder where its relative humidity is greatly increased by the moisture extracted from the wet clothes, then cooled to condense and remove this moisture content and reduce the relative humidity of the air, and then again heating this air in which the relative humidity has been greatly reduced and again passing it through the clothes.

The novel invention employs a continuous refrigeration cycle for heating the atmosphere in a completely enclosed and insulated compartment, subsequently cooling this atmosphere and condensing out its moisture content to thereby reduce its relative humidity, and again heating this dried atmosphere for re-circulation and re-use.

The invention further comprehends a novel method for most effectively drying clothes in a continuous operation and in a complete enclosure.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in front elevation of the novel drying unit.

Figure 2 is a view in vertical cross section taken on the irregular line 2—2 of Figure 3.

Figure 3 is a view in vertical cross section taken on the line 3—3 of Figure 2.

Figure 4 is a view in vertical cross section taken on the line 4—4 of Figure 1.

Figure 5 is a diagrammatic view of the humidostat control.

Referring more particularly to the novel illustrative embodiment disclosed in the drawings, the drying unit comprises an enclosure or chamber 1 completely insulated from the outside atmosphere by suitable insulation 2 and mounted upon a base 3. Rotatably mounted within the enclosure and upon a horizontal shaft 4 is a perforated container or drum 5 preferably provided with a plurality of spaced ribs or vanes 6 upon its interior which are adapted to tumble the clothes as the drum or receptacle is rotated to thereby uniformly expose the laundry or clothes being dried and to facilitate the drying operation.

As more clearly shown in Figure 4, the entire circumference or cylindrical surface of the drum is preferably perforated to permit air to pass therethrough for drying the contained clothes. The front of the enclosure 1 is provided with a door or closure 7 shown as pivotally mounted at 8, and provided with a latch 9 for retaining it in closed position or for permitting it to be opened for ready access to the interior of the container or receptacle 5 through the opening 10.

Completely enclosed and self-contained within the unit is a refrigerating system including a pump or compressor 11 for a suitable refrigerant. This system operates on the compression principle in which the pump forces the refrigerant under compression through the conduit 12 to the hot or condensing coil 13, then through the expansion valve 14 to the cold or evaporating coil 15 from where it passes through the conduit 16 back to the pump or compressor 11 in a closed cycle. The refrigerant under compression and in a hot state passes downwardly through the hot coil or condenser 13 and is condensed by the cold air that is passed upwardly around this coil, and by exothermic action, this air is heated to the desired degree. The condensed or liquified refrigerant is then passed through the expansion valve 14 where it is again transferred into a gaseous state and passed through the cold or expansion coil 15, where, by endothermic action, the heat contained in the air is absorbed and the air cooled to desired degree. It will be appreciated that the refrigerant passes through a continuous refrigeration cycle in which it is adapted to heat air to be supplied to the drum or clothes container 5 and to cool this air after it has passed through the container and absorbed moisture. In addition to cooling the moisture laden air, the moisture content is condensed out and collected in a funnel-shaped discharge passage 17 from where it may be discharged into any suitable drain for final disposal.

In order to circulate the air used in drying the clothes through a continuous closed path, the invention comprehends provision of a fan or blower 18 driven from a motor or other prime mover 19 suitably mounted at 20 upon the bottom 21 of the enclosure. This fan or blower is mounted in an opening connecting the compartment in which the coil 15 is located with the compartment in which coil 13 is mounted, so that the air is blown by the fan 18 rearwardly and upwardly over the hot coil 13, then through the opening 22 connecting the compartment in which the hot coil is located with the compartment in which the container or drum 5 is rotatably mounted. After the air has passed through the container or drum 5, it is exhausted or discharged through the opening 23 and passed over the cold coil 15 where its humidity is greatly lowered. This cold air of greatly reduced humidity is then again passed over and around the heating coil 13 to be reheated and re-circulated for re-use.

As clearly shown in Figures 2 and 3, the enclosure is divided into separate compartments in which are preferably located the compressor or pump 11, the cold or evaporating coil 15, the perforated container or drum 5, and the hot or condensing coil 13 and motor 19, insulated against heat transfer to and from each other except in the direction of the circulating air in the closed cycle, and with the fan or blower 18 mounted in an opening between the cold coil and the hot coil so that the circulating air after the moisture has been condensed, is drawn through this opening and passed over the motor and then over the hot coil for circulation and recirculation in a closed path.

In order to operate the entire mechanism as a self-contained unit and through a single motor or prime mover 19, the shaft of this motor is provided with a pulley 24 adapted to rotate a pulley 25 through a belt 26. This pulley 25 is mounted upon the shaft of the pump or compressor 11 and in a manner well-known in refrigerating systems, compresses the refrigerant and forces it outwardly through the conduit 12. Also mounted upon the shaft of the motor 19 is a pulley 27 adapted to rotate a pulley 28 through a belt 29. The pulley 28 is mounted upon a shaft carrying a small pulley 30 adapted to rotate the pulley 31 through a belt 32 mounted upon the external end 33 of the shaft 4 upon which the drum or receptacle 5 is mounted and carried through the end wall 34 and sleeve 35.

In Figure 5 is disclosed a diagram of the humidostat control including a humidostat control mechanism or relay 36 on the enclosure 1 for controlling the operation of the unit. The control plate 37 is divided into suitable designations describing the condition of the clothes at the end of the cycle such as damp dry, ironer dry and dry, or intermediate stages thereof, and is provided with a manually adjustable indicator or control knob 38 which is moved by the operator to the designation for the condition of dryness desired. A suitable humidostatic actuating element 39 is mounted in the drying chamber and adapted to stop operation by breaking the circuit 40 to the motor 19 when the relative humidity of the air leaving the clothes chamber has been reduced to the satisfactory predetermined designated amount. This permits the clothes to be dried completely or in varying degrees as desired.

Having thus disclosed my invention, I claim:

A compact and self-contained clothes drying unit comprising an enclosure completely insulated from the outside atmosphere, partitions in the enclosure for dividing it into separate compartments, a perforated container rotatably mounted within one of the compartments for receiving laundry to be dried, a refrigerating unit including a compressor, a condensing coil, an expansion valve and expansion coil, with the compressor, condensing coil and expansion coil disposed in separate compartments, conduits connecting the compressor with the condensing coil, expansion valve and expansion coil in sequence and back to the compressor to provide a continuous circuit for circulating refrigerant in the unit, an opening in the partition between the container compartment and expansion coil compartment, an opening in the partition between the expansion coil compartment and condensing coil compartment, and an opening in the partition between the condensing coil compartment and the container compartment, a circulating fan and a motor within the enclosure for operating the fan and compressor disposed between the expansion coil and the condensing coil for circulating air in the unit in a closed cycle by drawing moisture laden air from the container compartment over the expansion coil and thereby continuously cooling this moisture-laden air and condensing out the moisture content, blowing this cooled air over the motor and condensing coil for heating the air and passing this heated air to and through the perforated container and back to the expansion coil in a continuous closed cycle until the laundry has been sufficiently dried.

THOMAS R. SMITH.

REFERENCES CITED

The following references are of record in the file of this patent:

UNITED STATES PATENTS

| Number | Name | Date |
|---|---|---|
| 1,567,710 | Carroll | Dec. 29, 1925 |
| 1,531,257 | Brockett | Mar. 24, 1925 |
| 1,213,999 | Balzer | Jan. 30, 1917 |
| 1,119,011 | Grosvenor | Dec. 1, 1914 |
| 2,335,553 | Valverde | Nov. 30, 1943 |
| 2,130,092 | Kettering | Sept. 13, 1938 |
| 2,108,084 | Strobridge | Feb. 15, 1938 |
| 2,050,625 | Orr | Aug. 11, 1936 |

FOREIGN PATENTS

| Number | Country | Date |
|---|---|---|
| 562,075 | French | Aug. 25, 1923 |
| 53,017 | Swedish | June 22, 1917 |